United States Patent
Isaji et al.

(10) Patent No.: US 7,184,889 B2
(45) Date of Patent: Feb. 27, 2007

(54) COLLISION-PREDICTION UNIT FOR A VEHICLE

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/952,777

(22) Filed: Sep. 30, 2004

(65) Prior Publication Data

US 2005/0107955 A1    May 19, 2005

(30) Foreign Application Priority Data

Nov. 13, 2003  (JP)  .............................. 2003-384139

(51) Int. Cl.
*G01S 13/93*  (2006.01)
*G08G 1/16*  (2006.01)

(52) U.S. Cl. ...................... 701/301; 340/903; 180/167

(58) Field of Classification Search ................ 701/301, 701/96; 340/903, 902, 904, 435, 436; 367/99, 367/909; 180/167, 169, 171
See application file for complete search history.

(56) References Cited

U.S. PATENT DOCUMENTS

| | | | | |
|---|---|---|---|---|
| 3,835,361 | A * | 9/1974 | Schubring | .................... 318/561 |
| 5,748,477 | A * | 5/1998 | Katoh | ......................... 701/301 |
| 6,223,117 | B1 * | 4/2001 | Labuhn et al. | ................. 701/93 |
| 6,324,462 | B1 | 11/2001 | Kageyama | |
| 6,411,204 | B1 * | 6/2002 | Bloomfield et al. | ........ 340/467 |
| 6,463,372 | B1 | 10/2002 | Yokota et al. | |
| 6,560,520 | B2 | 5/2003 | Yokota et al. | |
| 6,574,540 | B2 | 6/2003 | Yokota et al. | |
| 6,831,572 | B2 * | 12/2004 | Strumolo et al. | ........... 340/903 |
| 6,873,286 | B2 * | 3/2005 | Albero et al. | .................. 342/71 |
| 2004/0085197 | A1 * | 5/2004 | Watanabe et al. | ........... 340/435 |

FOREIGN PATENT DOCUMENTS

| | | |
|---|---|---|
| EP | 1 179 446 A1 | 2/2002 |
| FR | 2 427 656 | 12/1979 |
| JP | A-11-031299 | 2/1999 |
| JP | A-11-034796 | 2/1999 |
| JP | A-2002-067843 | 3/2002 |
| JP | A-2002-342899 | 11/2002 |

OTHER PUBLICATIONS

Communication from French Patent Office dated Jun. 24, 2005.
Office Action from Japanese Patent Office issued on Sep. 12, 2006 for the corresponding Japanese patent application No. 2003-384139 (a copy and partial English translation thereof).

* cited by examiner

*Primary Examiner*—Dalena Tran
(74) *Attorney, Agent, or Firm*—Posz Law Group, PLC (57) ABSTRACT

A collision-prediction unit for a vehicle including a road condition detector, a maximum deceleration estimator, a forward vehicle detector, a forward vehicle deceleration calculator, and a collision examiner is provided. The road surface detector detects a condition of a road surface on which the vehicle travels. The maximum deceleration estimator calculates a maximum vehicle deceleration for the vehicle on the road surface having the detected condition. The forward vehicle detector detects a moving condition of a forward vehicle located ahead of the vehicle. The forward vehicle deceleration calculator calculates a forward vehicle deceleration based on the moving condition of the forward vehicle. The collision examiner determines whether a collision between the vehicle and the forward vehicle is imminent by comparing the forward vehicle deceleration to the maximum vehicle deceleration of the vehicle.

15 Claims, 5 Drawing Sheets

COLLISION-PREDICTION UNIT FOR A VEHICLE

CROSS REFERENCE TO RELATED APPLICATIONS

This application is based upon and claims the benefit of priority of Japanese Patent Application No. 2003-384139, filed on Nov. 13, 2003, the contents of which are incorporated herein by reference.

FIELD OF THE INVENTION

The present invention relates to a collision-prediction unit for aiding in the prevention of vehicle collisions.

BACKGROUND OF THE INVENTION

JP2002-342899A discloses a driving support system for detecting the imminence of a vehicle colliding with another vehicle. The driving support system detects information including vehicle position, orientation, and velocity of a driven vehicle. The system retrieves object information including position, orientation, and velocity from a communication device located on at least one other vehicle.

Based on the driving information and object information, the driving support system estimates a probability that a vehicle collision will occur. If the probability is high, the driving support system displays the relative positions of the vehicles on a map and activates an alarm. The alarm is activated at a level corresponding to the probability of the collision.

The driving support system described above estimates the probability of a collision based on information received from communication devices located on other vehicles and, therefore, its versatility is limited.

SUMMARY OF THE INVENTION

The present invention provides a collision-prediction unit capable of promptly determining the probability of a vehicle colliding with another forwardly disposed vehicle. The collision-prediction unit includes a road condition detector, a maximum deceleration estimator, a forward vehicle detector, a forward vehicle deceleration calculator, and a collision examiner. The road condition detector detects a condition of a road surface on which the vehicle travels. The maximum deceleration estimator calculates a maximum deceleration for the vehicle on the particular road surface detected by the road condition detector. The forward vehicle detector detects a moving condition of a forward vehicle located ahead of the vehicle. The forward vehicle deceleration calculator calculates a forward vehicle deceleration based on the moving condition of the forward vehicle detected by the forward vehicle detector. The collision imminence examiner compares the forward vehicle deceleration to the maximum vehicle deceleration to determine if a collision between the vehicle and the forward vehicle is imminent.

BRIEF DESCRIPTION OF THE DRAWINGS

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

In each of the following embodiments, a collision-prediction unit is described as a driving support system located on a vehicle.

First Embodiment

Figure 1:
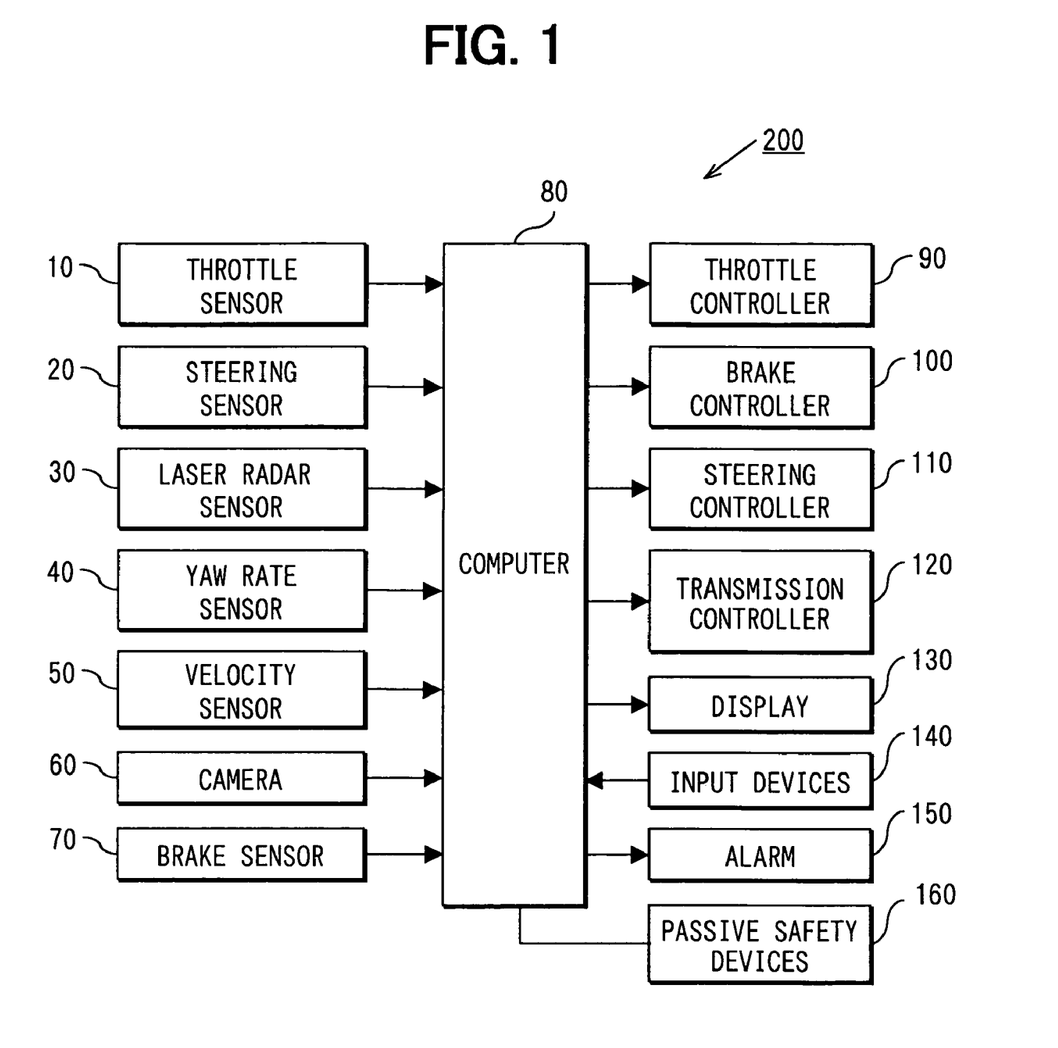
FIG. 1 is a block diagram of a driving support system including a collision-prediction unit according to a first embodiment of the present invention.

FIG. 1 depicts a driving support system 200 in accordance with the principles of the present invention. The driving support system 200 includes a throttle sensor 10, a steering sensor 20, a laser radar 30, a yaw rate sensor 40, a velocity sensor 50, a camera 60 with an imaging device such as a CCD (Charge-Coupled Device) or a CMOS (Complementary Metal Oxide Semiconductor) sensor, a brake sensor 70, a throttle controller 90, a brake controller 100, a steering controller 110, a transmission controller 120, a display 130, an input device 140, an alarm 150, and passive safety devices 160.

The driving support system 200 further includes a computer 80 in data communication with each of the components listed above. The computer 80 includes input/output interfaces and an assortment of electrical control circuits as is commonly known in the industry.

In general, the computer 80 is adapted to estimate a probability that the vehicle equipped with the driving support system 200 will collide with a vehicle located forward thereof, hereinafter referred to as the forward vehicle. The computer 80 bases this estimation on information received from each of the sensors shown in FIG. 1. If the computer estimates a high probability of collision, it activates at least one of the display 130 and the alarm 150, thereby prompting a driver to take evasive action. The computer 80 then evaluates the evasive action taken by the driver. If the evasive action is deemed to be ineffective, the computer 80 sends a signal to the brake controller 100 to start a braking operation. Additionally, the computer 80 may actuate the passive safety devices 160, which may include devices such as pretensioners and/or airbags.

As stated above, the computer 80 estimates the probability of a collision based on information received from the sensors. With reference to FIG. 1, each of the sensors will now be described. The throttle sensor 10 detects the position of a throttle on the vehicle between an open position and a closed position. The throttle sensor 20 then sends a signal representing the throttle position to the computer 80. The steering sensor 20 detects a change in a steering angle of the vehicle and calculates a relative steering angle based on the change. The steering sensor 20 then sends a signal representing the relative steering angle to the computer 80.

The laser radar 30 detects a distance to, a relative velocity to, and an orientation of a forward vehicle. An optical signal such as a laser light wave is emitted, which then reflects off of the forward vehicle and is received by the laser radar 30. The laser radar 30 transforms the deflected signal into an electrical signal and sends it to the computer 80. It should be appreciated that in an alternative embodiment, electromagnetic waves such as millimeter waves, microwaves, or ultrasonic waves may also be used.

The yaw rate sensor 40 detects the angular velocity of the vehicle around a vertical axis and transmits this information to the computer 80. The velocity sensor 50 detects the travel velocity of the vehicle by detecting a rotational frequency of at least one wheel on the vehicle. The camera 60 is adapted to take images of the road surface in front of the vehicle and transmit information about the image to the computer 80.

More specifically, the camera 60 transforms each image into an electrical signal and sends that signal to the computer 80. Based on this signal, the computer 80 determines a condition of the road surface directly in front of the vehicle. The brake sensor 70 detects whether a brake pedal in the vehicle is in a depressed state and sends a signal to the computer 80 identifying such.

The computer 80 controls the throttle controller 90, brake controller 100, steering controller 110, transmission controller 120, and passive safety devices 160 according to the signals received from the throttle sensor 10, brake sensor 70, and steering sensor 20. The throttle controller 90 adjusts the position of the throttle between the open and closed positions and, therefore, power generated by a power source such as an internal combustion engine. The brake controller 100 adjusts a braking pressure applied to a braking system of the vehicle. The steering controller 110 adjusts the steering angle of the vehicle. The transmission controller 120 selects a gear position of a transmission, thereby controlling the vehicle velocity.

In an exemplary embodiment, the display 130 includes a Liquid Crystal Display disposed in a central console of a passenger compartment of the vehicle. The display 130 is enabled to display information sent by the computer 80 and is intended to alert the driver of an imminent collision. The input device 140 is envisioned to include a touch screen provided in the display 130. Alternatively, the input device 140 may include a plurality of mechanical switches disposed in a dashboard or center console of the vehicle. In an exemplary embodiment, the alarm 150 includes an audible alarm having a magnitude corresponding to a signal sent by the computer 80. Alternatively, the alarm 150 may include a visual alarm having a magnitude according to a signal sent by the computer 80 or any other foreseeable device capable of serving the principles of the present invention.

The computer 80 detects the imminence of a collision with a forward vehicle by analyzing the signals described above. If it is determined that a collision is imminent, the computer 80 sends a signal to the display 130 and/or the alarm 150 to alert the driver.

Figure 2:
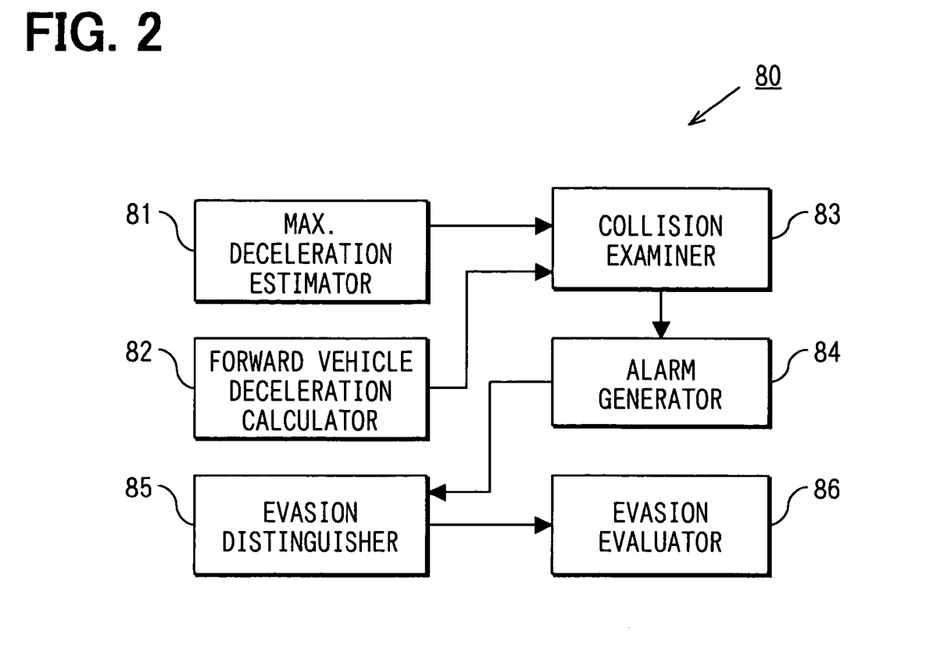
FIG. 2 is a block diagram of a computer included in the collision-prediction unit of the first embodiment.

FIG. 2 is a block diagram illustrating the computer 80 included in the first embodiment of the driving support system 200. The computer 80 includes a maximum deceleration estimator 81, a forward vehicle deceleration calculator 82, a collision examiner 83, an alarm generator 84, an evasion distinguisher 85, and an evasion evaluator 86.

The maximum deceleration estimator 81 is operable to identify the condition of the road surface in front of the vehicle based on image information produced by the camera 60. For example, in one embodiment the maximum deceleration estimator 81 may determine if the road surface is wet or dry. The maximum deceleration estimator 81 then selects a coefficient of friction ($\mu$) for the road surface by inputting the identified condition into a predetermined transformation table. Lastly, the maximum deceleration estimator 81 calculates a maximum deceleration ($\alpha_{max}$) of the vehicle on the particular road surface having the selected coefficient of friction ($\mu$).

To determine the condition of the road surface using the image information taken by the camera 60, the maximum deceleration estimator 81 calculates an average luminance across the image. The road condition is determined to be wet if the average luminance is greater than a predetermined criterion value. Alternatively, the road condition is determined to be dry if the average luminance is less than the predetermined criterion value.

By setting multiple criterion values, multiple road conditions can be identified. For example, one criteria value may identify the road as being under water, while others may identify the road as being frozen or snow covered. It should be appreciated that while an average luminance-based method of determining the road condition has been disclosed herein, alternative methods are intended to be within the scope of the present invention.

As stated, the maximum deceleration estimator 81 selects a road surface coefficient of friction ($\mu$) existing between the road surface and the vehicle wheels. In this embodiment, the friction coefficient ($\mu$) is derived from a predetermined transformation table calibrated such that the friction coefficient ($\mu$) is 0.8 for a dry road surface.

The maximum deceleration ($\alpha_{max}$) of the vehicle on the particular road surface is estimated as a function of the coefficient of friction ($\mu$). The maximum deceleration ($\alpha_{max}$) is defined as occurring when vehicle brakes are applied to lock the wheels such that the vehicle skids.

When the coefficient of friction ($\mu$) is 0.8, the maximum deceleration ($\alpha_{max}$) is estimated by the following equation, hereinafter referred to as equation (1): Maximum Deceleration ($\alpha_{max}$)=$\mu \times G$=$0.8 \times 9.8$=$7.84$ (m/s$^2$), wherein G denotes the acceleration of gravity.

It is important to note that while the maximum deceleration ($\alpha_{max}$) has been disclosed as being as being estimated as a function of the road surface coefficient of friction ($\mu$), it also depends on the shape of the vehicle body, the weight of the vehicle, the vehicle body center of gravity, the contact area of the wheels, and many other factors. These parameters of the forward vehicle can be generally derived from the image information taken by the camera 60. The image information can be used to classify the forward vehicle into one of a plurality of categories of vehicles each having distinct parameters. These derived parameters can then be used to adjust the maximum deceleration ($\alpha_{max}$) of the forward vehicle estimated by equation (1).

The forward vehicle deceleration calculator 82 calculates a forward vehicle deceleration ($\alpha$). The forward vehicle deceleration ($\alpha$) is calculated as a function of the velocity of the vehicle and a change in the relative velocity of the vehicle to the forward vehicle over a period of time. The laser radar 30 detects the relative velocity and the velocity sensor 50 detects the vehicle velocity.

The collision examiner 83 determines whether a collision is imminent or not by comparing the maximum deceleration ($\alpha_{max}$) and the forward vehicle deceleration ($\alpha$).

If the forward vehicle deceleration ($\alpha$) is smaller than the probable maximum deceleration ($\alpha$max), the computer 80 determines that the driver of the forward vehicle is conducting a normal braking operation. In this case, if the distance to the forward vehicle decreases, the vehicle can safely decelerate by a similarly normal braking operation. Accordingly, the imminence of the vehicle colliding with the forward vehicle is estimated to be low.

Figure 3:
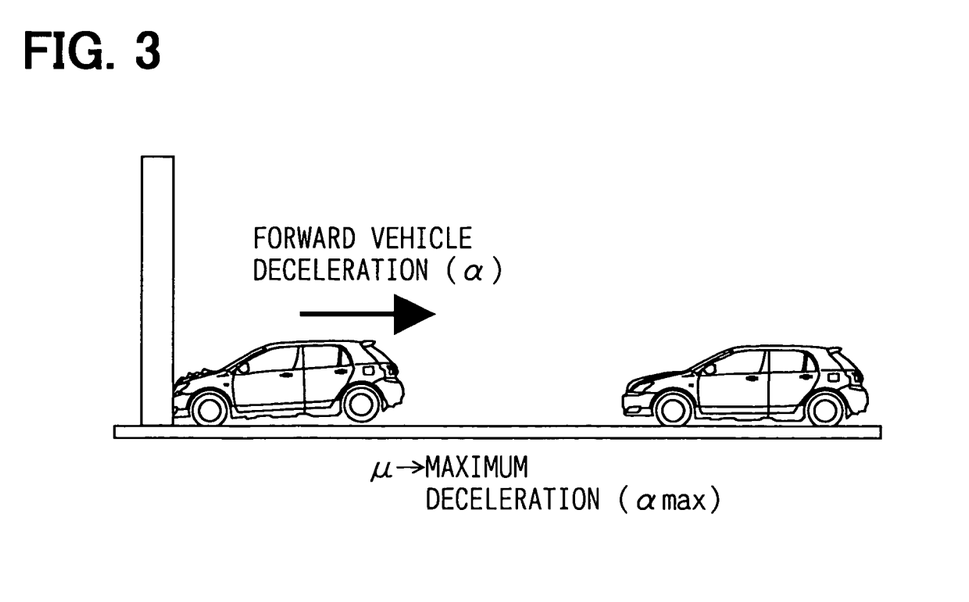
FIG. 3 is a schematic view of a forward car decelerating by collision with an object.

However, if the forward vehicle deceleration ($\alpha$) is equal to or larger than the probable maximum deceleration ($\alpha_{max}$), the computer 80 determines that the forward vehicle has decelerated due to a collision with another vehicle, a structure, or a similar obstruction, as shown in FIG. 3. In these cases, if the driver of the vehicle promptly recognizes an irregular movement of the forward vehicle, the driver may be able to maneuver the vehicle to avoid a collision. However, if the driver does not recognize the irregular movement or if such recognition is delayed, the imminence to the vehicle colliding with the forward vehicle is estimated to be high.

As described above, the imminence of a vehicle colliding with a forward vehicle can be estimated by comparing the maximum deceleration ($\alpha_{max}$) of the vehicle to the forward vehicle deceleration ($\alpha$). This estimation may even be made if there is not enough time for the driver to manipulate the vehicle and avoid the collision.

The alarm generator 84 generates the alarm 150 when the collision examiner 83 determines that a collision is imminent. The alarm 150 promptly informs the driver of the imminence of the collision such that the driver is able to start operations to avoid the collision.

The evasion distinguisher 85 determines whether the driver has taken any evasive operation after activation of the alarm generator 84. If any evasive manipulation is detected, the evasion distinguisher 85 sends the information to an evasion evaluator 86 in the form of an electrical signal. If no evasive manipulation is detected, the evasion distinguisher 85 sends a signal to the throttle controller 90 instructing it to close the throttle and to the brake controller 100 instructing it to start braking.

If evasive manipulations such as closing the throttle, braking, and/or steering changes are not taken, the driver is determined to be unaware of the imminence of a collision and the collision is deemed to be inevitable. In such a case, the evasion distinguisher 85 avoids the collision by instructing the throttle controller 90 to close the throttle and the brake controller 100 to begin automatic braking, as described above. The evasion evaluator 86 determines whether the collision is inevitable or not according to the evasive manipulation detected by the evasion distinguisher 85. If the evasion evaluator 86 determines that a collision is inevitable according to the evasive manipulation taken by the driver, it actuates the passive safety devices 160.

Hence, it is important to note that if the evasion manipulation is not promptly taken or is inadequate a collision may occur even if the alarm informs the driver that a collision is imminent. Therefore, if the evasion evaluator 86 determines that the collision is inevitable, it actuates the pretensioners and/or airbags, as described above. Accordingly, this operation reduces any potential damage to the vehicle occupants during a collision.

The judgment of whether the collision is inevitable or not is based on information regarding the relative positions of the vehicle and the forward vehicle. Such information may include velocity, acceleration, steering, and road surface condition.

Figure 4:
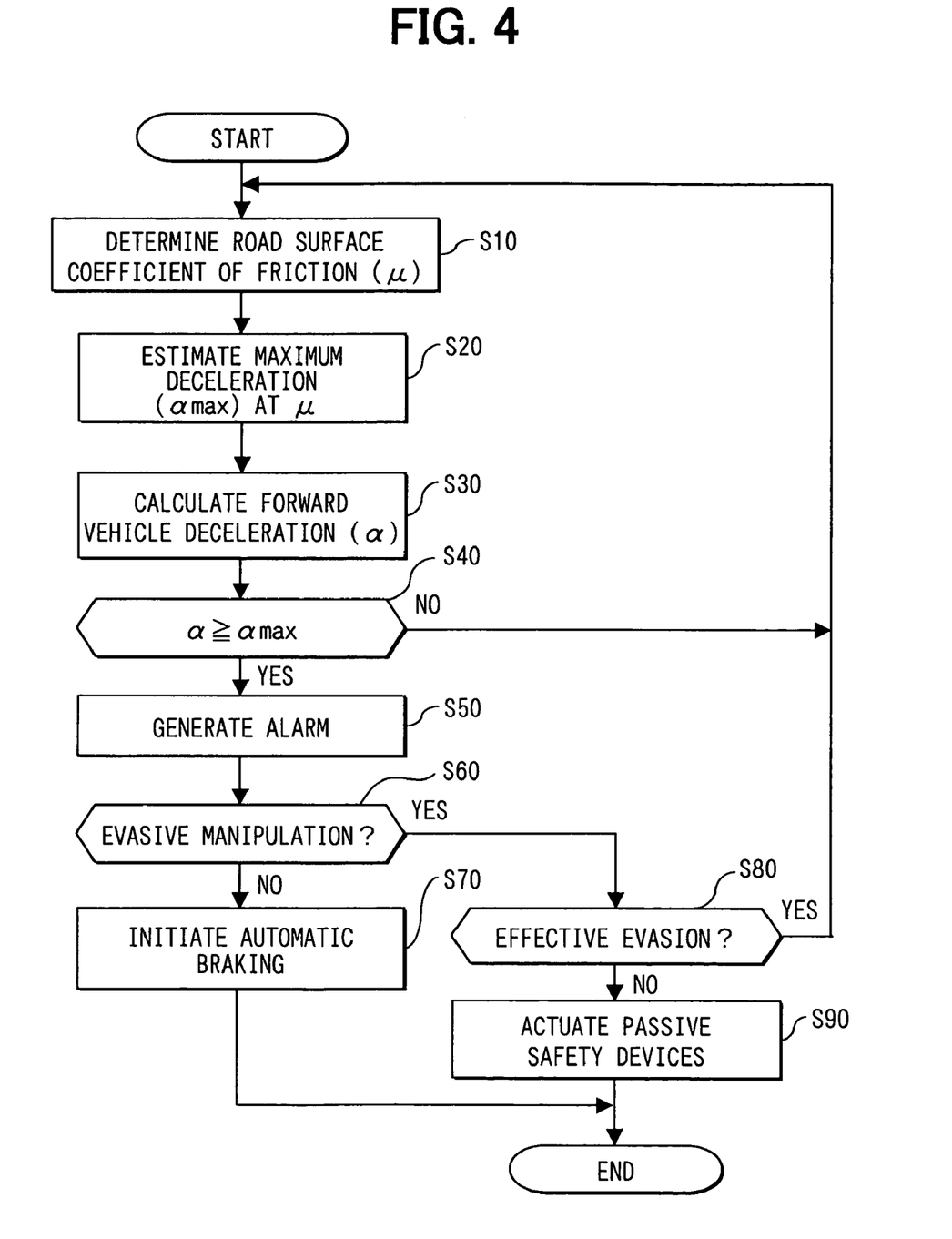
FIG. 4 is a flowchart illustrating a collision-prediction process performed by the driving support system of the first embodiment.

A collision-prediction process conducted by the driving support system 200 of the first embodiment is now described with reference to FIG. 4.

First, in step S10, the maximum deceleration estimator 81 determines the road surface friction coefficient ($\mu$). Then, in step S20, the maximum deceleration estimator 81 estimates a maximum deceleration ($\alpha_{max}$) for the vehicle on the road surface having the friction coefficient ($\mu$). In step S30, the forward vehicle deceleration calculator 82 calculates the forward vehicle deceleration ($\alpha$).

In step S40, the collision examiner 83 determines whether the forward vehicle deceleration ($\alpha$) is larger than the maximum deceleration ($\alpha_{max}$). If the forward vehicle deceleration ($\alpha$) is larger than the maximum deceleration ($\alpha_{max}$), the imminence of a collision with the forward vehicle is estimated to be high and the process goes to step S50. However, if the forward vehicle deceleration ($\alpha$) is less than the maximum deceleration ($\alpha_{max}$), the imminence of a collision is estimated to be low and the process returns to step S10.

In step S50, the alarm generator 84 generates an alarm to inform the driver of the imminence of a collision. In step S60, the evasion distinguisher 85 determines whether the driver has taken any evasive manipulation. If so, the process goes to step S80. If not, the process goes to step S70.

In step S70, the brake controller 100 initiates an automatic braking process.

In step S80, the evasion evaluator 86 determines whether the evasive manipulation is effective to evade the collision. If yes, the process returns to step S10 and the above-described steps are repeated. If no, the process goes to step S90. Step S90 includes the computer 80 actuating the passive safety devices 160.

As described above, the driving support system 200 of the present embodiment calculates the deceleration of the forward vehicle and the maximum deceleration of the driven vehicle on the particular road surface condition detected. If the forward vehicle deceleration exceeds the maximum deceleration, a collision is deemed imminent and an alarm is generated to promptly warn the driver.

If no evasive manipulation is taken after the generation of the alarm, a braking process is automatically started to evade the collision. If the collision is inevitable even with the evasive manipulation, passive safety devices are actuated and damage to the vehicle occupants is reduced.

Second Embodiment

The second embodiment is described focusing on its differences from the first embodiment. The first embodiment identifies the imminence of a collision by comparing the forward vehicle deceleration ($\alpha$) to the maximum deceleration ($\alpha$max), as described above. The driving support system 200 of the second embodiment identifies the imminence of a collision by comparing a vehicle velocity to a relative vehicle velocity defined as the difference between the velocities of the vehicle and the forward vehicle.

Figure 5:
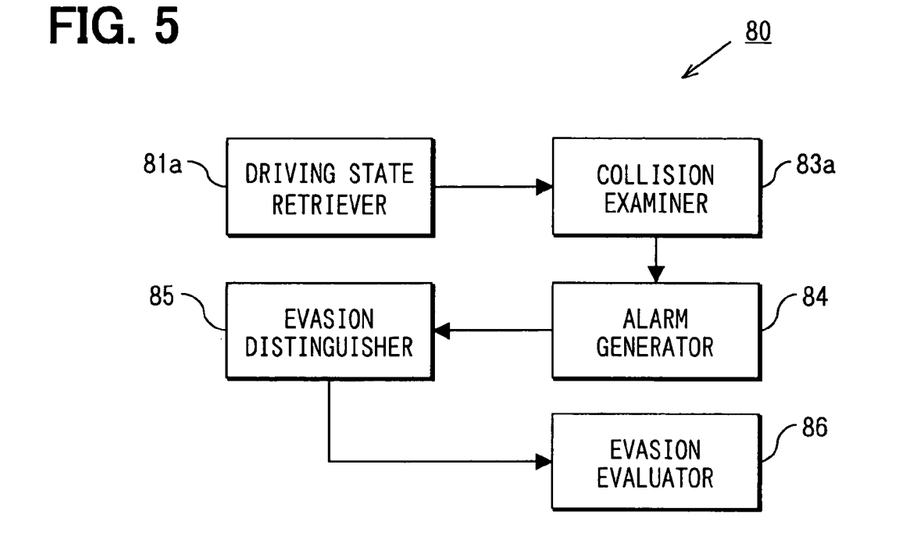
FIG. 5 is a block diagram of a computer included in a collision-prediction unit according to a second embodiment of the present invention.

FIG. 5 is a block diagram showing the computer 80 of the second embodiment including a driving state retriever 81a, a collision examiner 83a, an alarm generator 84, an evasion distinguisher 85, and an evasion evaluator 86. The alarm generator 84, evasion distinguisher 85, and evasion evaluator 86 in FIG. 5 execute the same processes as described above in accordance with the first embodiment and, therefore, are identified by like reference characters.

The driving state retriever 81a identifies the lane that the vehicle occupies by analyzing image information acquired by the camera 60. The driving state retriever 81a also detects a forward vehicle in the same lane among forward vehicles detected by the laser radar 30. The driving state retriever 81a also retrieves a velocity of the vehicle from the velocity sensor 50 and a relative vehicle velocity to the forward vehicle in the same lane. The driving state retriever 81a then sends the velocity of the vehicle and the relative vehicle velocity to the collision examiner 83a.

The collision examiner 83a determines whether a collision is imminent or not by comparing the vehicle velocity to the relative vehicle velocity. If it is determined that a collision is imminent, the collision examiner 83a sends a signal to activate the alarm generator 84.

Figure 6A:
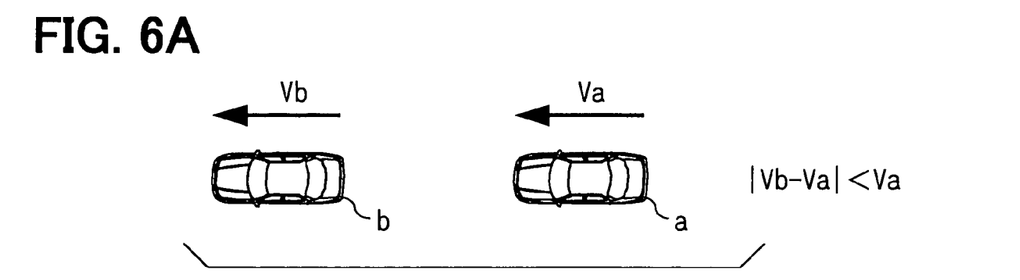
FIG. 6A is a schematic view of two vehicles having a relative velocity that is less than a velocity of one of the vehicles.
Figure 6B:
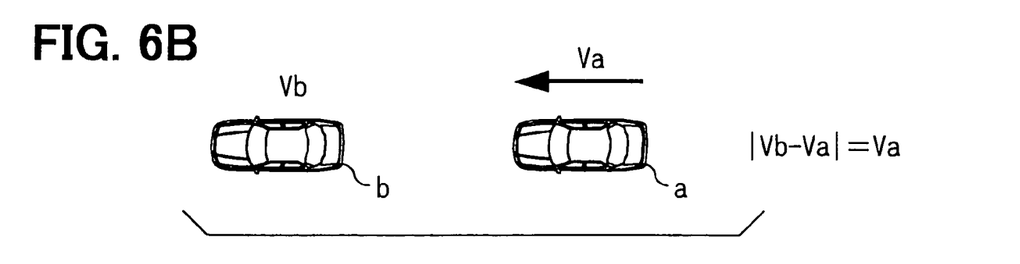
FIG. 6B is a schematic view of two vehicles having a relative velocity that is equal to a velocity of one of the vehicles.
Figure 6C:
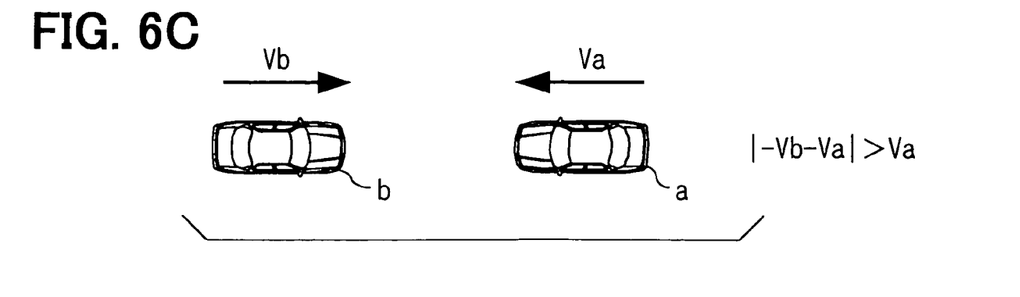
FIG. 6C is a schematic view of two vehicles having a relative velocity that is larger than a velocity of one of the vehicles.

FIG. 6A depicts a forward vehicle (b) having a velocity Vb moving in the same direction as a vehicle (a) having a velocity Va. Therefore, the relative vehicle velocity |Vb−Va| is smaller than the velocity Va of vehicle (a). FIG. 6B depicts the forward vehicle (b) having a velocity Vb equal to zero and the vehicle (a) having velocity Va. Therefore, the relative vehicle velocity |Vb−Va| is equal to the velocity Va of vehicle (a). FIG. 6C depicts the forward vehicle (b) having a velocity Vb moving in a direction opposite to the vehicle (a) having velocity Va. Therefore, the relative vehicle velocity |Vb−Va| is larger than the velocity Va of vehicle (a).

Accordingly, if the relative vehicle velocity |Vb−Va| exceeds the vehicle velocity Va, as shown in FIG. 6C, the forward vehicle is determined to be an oncoming vehicle most likely invading the vehicle's lane from a counter lane. Therefore, the above-described comparison promptly detects the imminence of a collision with an oncoming vehicle.

Figure 7:
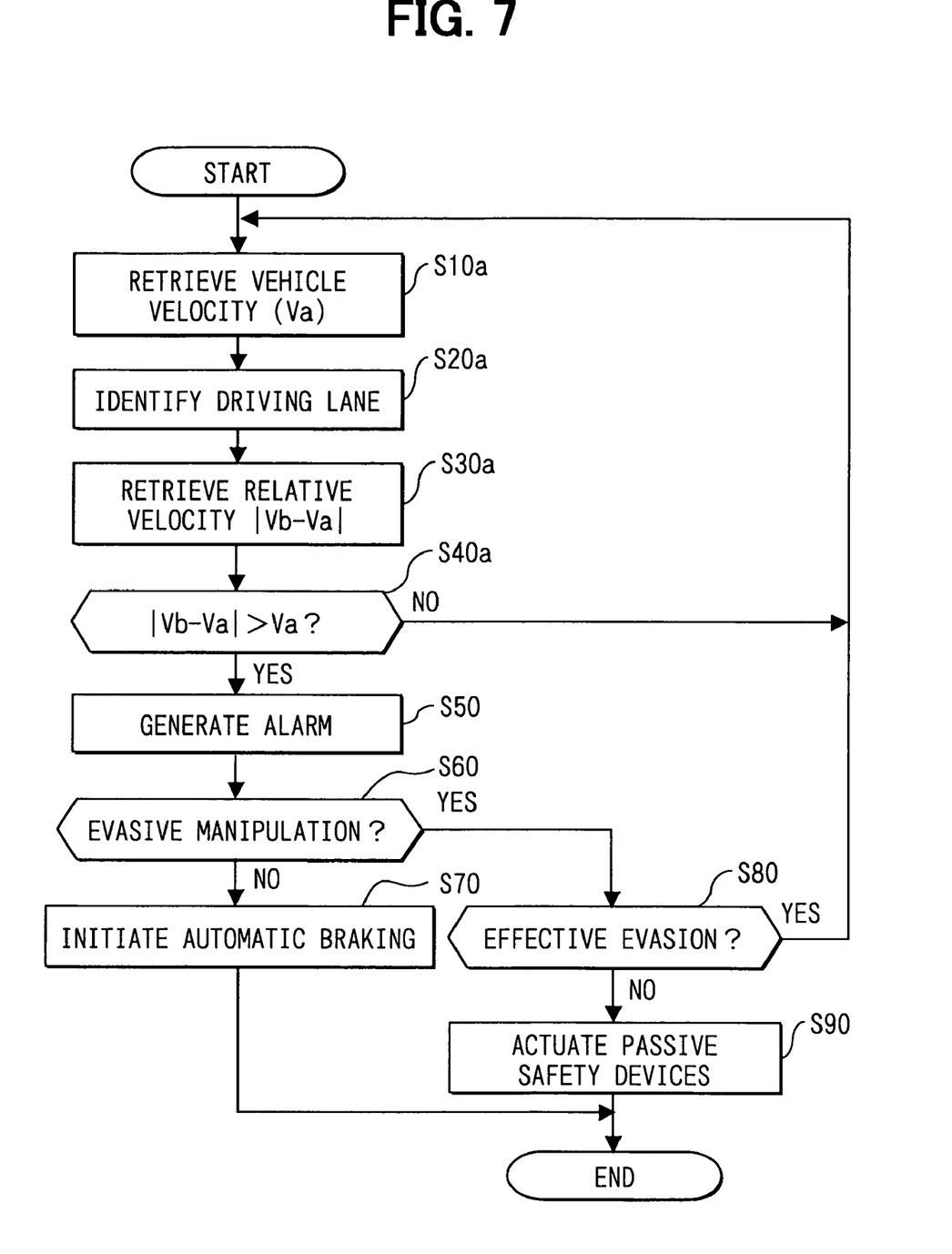
FIG. 7 is a flowchart illustrating a collision-prediction process performed by the collision-prediction unit of the second embodiment.

With reference to the flowchart shown in FIG. 7, a process for detecting the imminence of a collision according to the driving support system 200 of the second embodiment is described. In FIG. 7, steps S50 to S90 include processes equivalent to steps S50 to S90 in FIG. 4 and are, therefore, identified by like reference characters.

In step S10a, the driving state retriever 81a retrieves the vehicle velocity Va. In step S20a, the driving state retriever 81a identifies what lane the vehicle (a) occupies. In step S30a, the driving state retriever 81a identifies the forward vehicle (b) in the same lane and retrieves the relative vehicle velocity |Vb−Va| between the vehicle (a) and the forward vehicle (b).

In step S40a, the collision examiner 83a determines whether the relative vehicle velocity |Vb−Va| is larger than the vehicle velocity Va. If yes, the imminence of a collision with the forward vehicle (b) is estimated to be high and the process goes to step S50. If no, the imminence of a collision is estimated to be low and the process returns to step S10a.

Therefore, it should be appreciated that the driving support system 200 of the second embodiment can promptly detect the presence of an imminent collision with an oncoming vehicle by comparing the vehicle velocity with the relative vehicle velocity.

Modified Embodiment 1

Furthermore, it should be appreciated that the alarm generator 84 of the first and second embodiments generates an alarm on the display 130 and/or the alarming device 150 to inform the driver that a collision is imminent. It should be appreciated that the alarm generator 84 may also include other alarming means such as honking the vehicle's horn, flashing the vehicle's headlights, or flashing the vehicle's hazard lights.

Modified Embodiment 2

Additionally, it should be appreciated that it may be useful to execute both the collision probability detector 83 of the first embodiment and the collision probability detector 83a of the second embodiment simultaneously. This would enable the driving support system 200 of the present invention to identify the imminence of collisions with both vehicles traveling toward and away from the driven vehicle within the same lane.

What is claimed is:

1. A collision-prediction unit for a vehicle comprising:
   a road condition detector for detecting a condition of a road surface on which the vehicle travels;
   a maximum deceleration estimator for estimating a maximum vehicle deceleration before a collision on the condition detected by the road condition detector;
   a forward vehicle detector for detecting a moving condition of a forward vehicle located ahead of the vehicle;
   a forward vehicle deceleration calculator for calculating a forward vehicle deceleration based on the moving condition of the forward vehicle detected by the forward vehicle detector;
   a forward vehicle collision determining means for determining a collision of the forward vehicle when the forward vehicle deceleration calculated by the forward vehicle deceleration calculator based on the moving condition detected by the forward vehicle detector is greater than the maximum vehicle deceleration estimated by the maximum deceleration estimator; and
   a collision examiner for determining whether a collision of the vehicle with the forward vehicle is imminent based on the collision of the forward vehicle determined by the forward vehicle collision determining means.

2. The collision-prediction unit according to claim 1, further comprising a velocity detector for detecting a velocity of the vehicle and wherein the forward vehicle detector detects at least a relative velocity of the vehicle to the forward vehicle and the forward vehicle deceleration calculator calculates the forward vehicle deceleration using the velocity of the vehicle and a change in the relative velocity over a period of time.

3. The collision-prediction unit according to claim 1, wherein the collision examiner determines that a collision is imminent when the forward vehicle deceleration is greater than the maximum vehicle deceleration.

4. The collision-prediction unit according to claim 1, further comprising:
   a vehicle velocity detector for detecting a velocity of the vehicle; and
   a relative velocity retriever for retrieving a relative velocity between the vehicle and a forward vehicle, wherein the collision examiner determines whether the collision is imminent by further comparing the relative velocity to the detected velocity of the vehicle.

5. The collision-prediction unit according to claim 1, further comprising an alarm generator for generating an alarm when the collision examiner determines that a collision is imminent.

6. The collision-prediction unit according to claim 5, wherein the alarm generator provides the alarm to a driver of the vehicle.

7. The collision-prediction unit according to claim 5, wherein the alarm generator provides the alarm to the forward vehicle.

8. The collision-prediction unit according to claim 5, further comprising:
   an evasion distinguisher for detecting an evasive manipulation of the vehicle;
   an evasion evaluator for determining whether the evasive manipulation detected by the evasion distinguisher occurred after the alarm was generated; and
   a brake controller for automatically braking the vehicle when the evasion distinguisher determines that no evasive manipulation has been taken after the alarm has been generated.

9. The collision-prediction unit according to claim 5, further comprising:
   an evasion distinguisher for detecting an evasive manipulation of the vehicle and determining whether the evasive manipulation has occurred after the alarm has been generated; and
   an evasion evaluator for determining whether the collision of the vehicle with the forward vehicle is avoidable by the evasive manipulation and for controlling at least one passive safety device when the collision is determined to be unavoidable.

10. A method of predicting a collision of a vehicle with a forward vehicle, comprising:
    estimating a maximum deceleration of the vehicle;
    estimating a forward deceleration of the forward vehicle;
    determining a forward collision of the forward vehicle when the forward deceleration is greater than the maximum deceleration; and
    determining an imminent collision of the vehicle with the forward vehicle based on the forward collision of the forward vehicle, and penetrating an alarm when the forward collision is determined, to notify at least one of a driver of the vehicle and a driver of the forward vehicle.

11. The method according to claim 10, further comprising:
    determining a velocity of the vehicle; and
    determining a relative velocity as the difference between the velocity of the vehicle and a velocity of the forward vehicle prior to estimating the maximum deceleration and the forward deceleration.

12. The method according to claim 11, further comprising detecting a condition of a road surface on which the vehicle travels and wherein the maximum deceleration is based on the condition of the road surface and the velocity of the vehicle and the forward deceleration is based on a change in the relative velocity over a period of time.

13. The method according to claim 11, further comprising:
    comparing the relative velocity to the velocity of the vehicle; and
    generating an alarm when the relative velocity is greater than the velocity of the vehicle to notify at least one of a driver of the vehicle and a driver of the forward vehicle that the forward vehicle is traveling toward the vehicle and a collision is imminent.

14. The method according to claim 10, further comprising:
    detecting an evasive manipulation of the vehicle;
    determining whether the evasive manipulation occurred after the alarm was generated; and
    automatically braking the vehicle when no evasive manipulation has been taken after the alarm has been generated.

15. The method according to claim 10, further comprising:
    detecting whether an evasive manipulation of the vehicle has occurred after the alarm has been generated;
    determining whether the evasive manipulation can avoid a collision between the vehicle and a forward vehicle; and
    actuating at least one passive safety device when the collision is determined to be unavoidable.

* * * * *